(12) United States Patent
Cummings

(10) Patent No.: US 10,281,283 B2
(45) Date of Patent: May 7, 2019

(54) APPARATUS AND METHODS FOR REDUCING DATA TRANSMISSION IN WIRELESS CLIENT-SERVER NAVIGATION SYSTEMS

(76) Inventor: Ian Cummings, Ypsilanti, MI (US)

(*) Notice: Subject to any disclaimer, the term of this patent is extended or adjusted under 35 U.S.C. 154(b) by 1226 days.

(21) Appl. No.: 12/115,262

(22) Filed: May 5, 2008

(65) Prior Publication Data

US 2008/0275633 A1 Nov. 6, 2008

Related U.S. Application Data

(63) Continuation-in-part of application No. 11/697,977, filed on Apr. 9, 2007.

(60) Provisional application No. 60/916,142, filed on May 4, 2007.

(51) Int. Cl.
  *G06T 11/00* (2006.01)
  *G01C 21/26* (2006.01)
  *G01C 21/34* (2006.01)

(52) U.S. Cl.
  CPC .......... *G01C 21/26* (2013.01); *G01C 21/34* (2013.01); *G01C 21/3476* (2013.01); *G01C 21/3484* (2013.01); *G06T 11/00* (2013.01)

(58) Field of Classification Search
  CPC .... G01C 21/3476; G01C 21/34; G01C 21/26; G01C 21/3626; G01C 21/3484; G01C 21/3673; G06T 11/00
  USPC ................. 382/232, 113; 701/208
  See application file for complete search history.

(56) References Cited

U.S. PATENT DOCUMENTS

| | | | |
|---|---|---|---|
| 5,172,321 A | 12/1992 | Ghaem et al. | |
| 5,243,528 A * | 9/1993 | Lefebvre | 701/429 |
| 5,406,492 A * | 4/1995 | Suzuki | 701/428 |
| 5,543,789 A | 8/1996 | Behr et al. | |
| 5,652,706 A | 7/1997 | Morimoto et al. | |
| 5,659,476 A | 8/1997 | LeFebvre et al. | |
| 5,848,377 A * | 12/1998 | Wong | 701/226 |
| 6,038,509 A | 3/2000 | Poppen et al. | |
| 6,038,559 A | 3/2000 | Ashby et al. | |
| 6,064,941 A | 5/2000 | Nimura et al. | |
| 6,107,944 A | 8/2000 | Behr et al. | |
| 6,324,472 B1 | 11/2001 | O'Shea | |
| 6,347,278 B2 | 2/2002 | Ito | |
| 6,381,535 B1 | 4/2002 | Durocher et al. | |
| 6,397,145 B1 * | 5/2002 | Millington | 701/432 |
| 6,611,753 B1 * | 8/2003 | Millington | 701/436 |

(Continued)

*Primary Examiner* — Utpal D Shah

(74) *Attorney, Agent, or Firm* — John G. Posa; Belzer PC

(57) ABSTRACT

Methods and apparatus to reduce data transmission in a wireless client-server navigation system. A request for data representative of a map-related feature is received at a server from a mobile client. Data describing the feature is obtained in the form of coordinates of line segments. An operation is performed on the data to generate data representative of the feature in a data-reduced format, and the reduced data is forwarded to the client. The operation responsible for producing the data-reduced format includes the steps of: receiving map data; partitioning the map into a plurality of tiles; designating a reference point within each tile; representing the feature in the form of offsets from the reference points; and wherein the data-reduced format is based upon the reference points and offsets. The embodiment may also include sending precalculated turn instruction to the client rather than sending data necessary to generate turn instructions.

11 Claims, 8 Drawing Sheets

| Enter from | Exit to | Instruction |
|---|---|---|
| 1 | 2 | Sharp turn left |
| 1 | 3 | Veer left |
| 1 | 4 | Veer right |
| 2 | 1 | Sharp turn right |
| 2 | 3 | Left turn |
| 2 | 4 | Go straight |
| 3 | 1 | Veer right |
| 3 | 2 | Turn right |
| 3 | 4 | Turn left |
| 4 | 1 | Veer left |
| 4 | 2 | Go straight |
| 4 | 3 | Turn right |

(56) References Cited

U.S. PATENT DOCUMENTS

| | | |
|---|---|---|
| 6,674,445 B1* | 1/2004 | Chithambaram et al. .... 345/619 |
| 6,845,322 B1 | 1/2005 | Chao et al. |
| 2001/0043745 A1* | 11/2001 | Friederich et al. ........... 382/232 |
| 2003/0014286 A1* | 1/2003 | Cappellini ........................ 705/5 |
| 2003/0229441 A1* | 12/2003 | Pechatnikov et al. ........ 701/201 |
| 2003/0231190 A1* | 12/2003 | Jawerth et al. ............... 345/660 |
| 2005/0288836 A1* | 12/2005 | Glass et al. ..................... 701/29 |
| 2007/0049260 A1* | 3/2007 | Yuhara et al. ............. 455/414.3 |

* cited by examiner

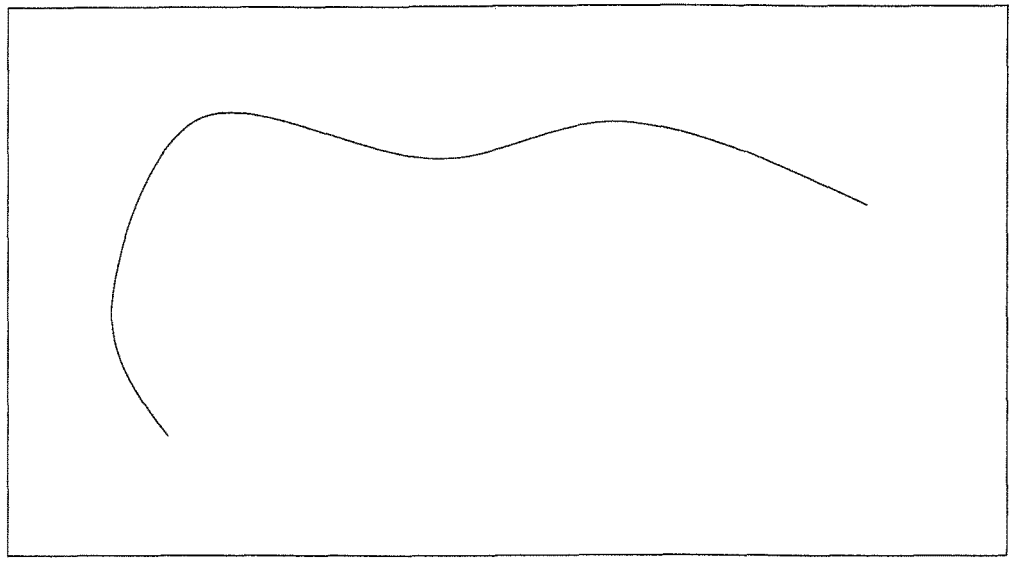
Figure 4    (Prior Art)
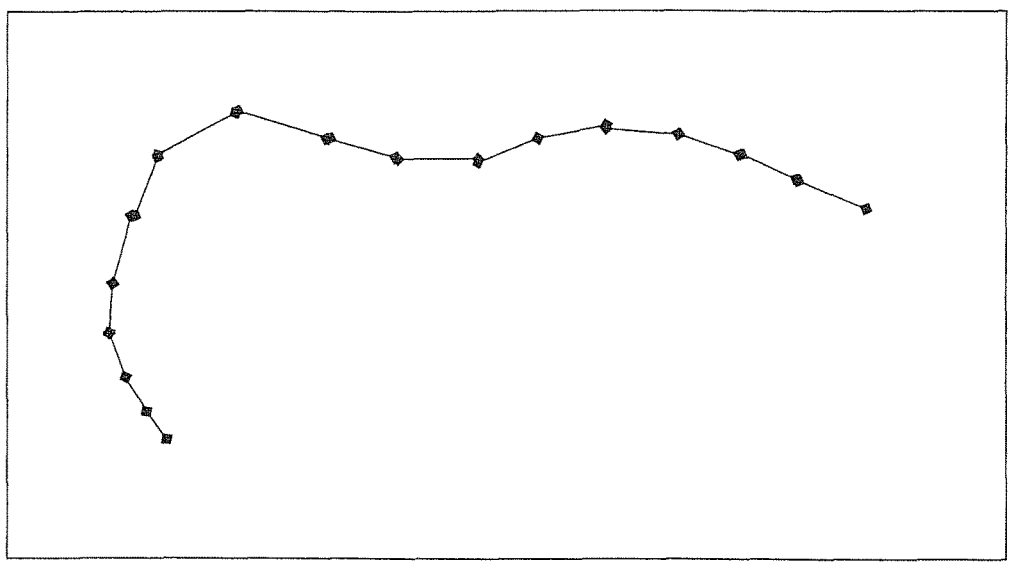
Figure 5    (Prior Art)

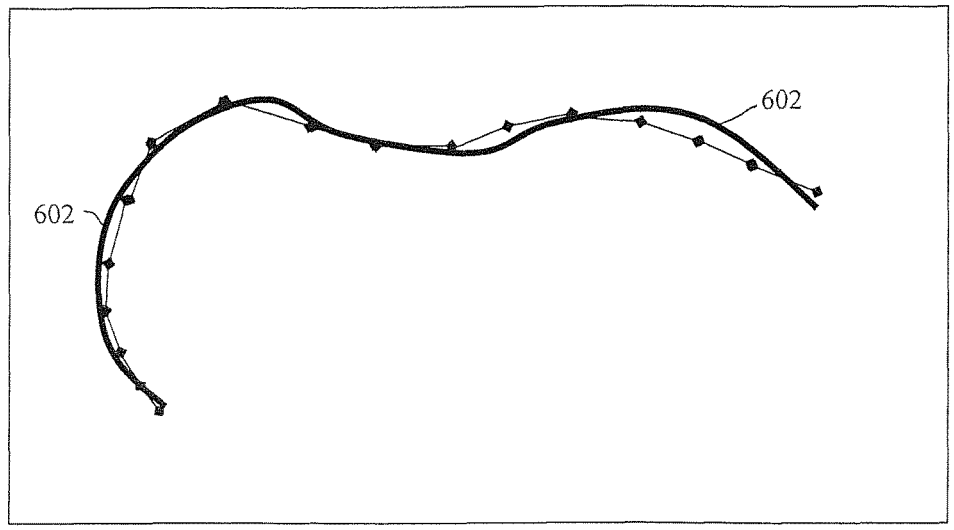

Figure 6

| Data transmitted in straight line representation | | |
|---|---|---|
| Point 1 | X coordinate | Y coordinate |
| Point 2 | X coordinate | Y coordinate |
| Point 3 | X coordinate | Y coordinate |
| Point 4 | X coordinate | Y coordinate |
| Point 5 | X coordinate | Y coordinate |
| Point 6 | X coordinate | Y coordinate |
| Point 7 | X coordinate | Y coordinate |
| Point 8 | X coordinate | Y coordinate |
| Point 9 | X coordinate | Y coordinate |
| Point 10 | X coordinate | Y coordinate |
| Point 11 | X coordinate | Y coordinate |
| Point 12 | X coordinate | Y coordinate |
| Point 13 | X coordinate | Y coordinate |
| Point 14 | X coordinate | Y coordinate |
| Point 15 | X coordinate | Y coordinate |
| Point 16 | X coordinate | Y coordinate |
| Point 17 | X coordinate | Y coordinate |

Fig-7A

| Data transmitted in curve construction representation |
|---|
| Parameter 1 |
| Parameter 2 |
| Parameter 3 |
| Parameter 4 |
| Parameter 5 |

| Enter from | Exit to | Instruction |
|---|---|---|
| 1 | 2 | Sharp turn left |
| 1 | 3 | Veer left |
| 1 | 4 | Veer right |
| 2 | 1 | Sharp turn right |
| 2 | 3 | Left turn |
| 2 | 4 | Go straight |
| 3 | 1 | Veer right |
| 3 | 2 | Turn right |
| 3 | 4 | Turn left |
| 4 | 1 | Veer left |
| 4 | 2 | Go straight |
| 4 | 3 | Turn right |

| Enter from | Exit to | Instruction |
|---|---|---|
| 1 | 2 | Sharp turn left |
| 1 | 3 | Veer left |
| 1 | 4 | Veer right |
| 2 | 1 | Sharp turn right |
| 2 | 3 | Left turn |
| 2 | 4 | Go straight |
| 3 | 1 | Veer right |
| 3 | 2 | Turn right |
| 3 | 4 | Turn left |
| 4 | 1 | Veer left |
| 4 | 2 | Go straight |
| 4 | 3 | Turn right |

APPARATUS AND METHODS FOR REDUCING DATA TRANSMISSION IN WIRELESS CLIENT-SERVER NAVIGATION SYSTEMS

REFERENCE TO RELATED APPLICATIONS

This application is a continuation-in-part of U.S. patent application Ser. No. 11/697,977, filed Apr. 9, 2007. This application also claims priority to U.S. Provisional Patent Application Ser. No. 60/916,142, filed May 4, 2007. The entire content of each application is incorporated herein by reference.

FIELD OF THE INVENTION

This invention relates generally to navigation systems and, in particular, to apparatus and methods for reducing data transmission in wireless client-server environments.

BACKGROUND OF THE INVENTION

The engineering and business requirements of navigation by wireless client-server (WCS) navigators, in which route searches and map generation are performed at a central location then transmitted to mobile units, differ somewhat from those of standard standalone navigators. One major difference is that for WCS navigators, data transmission costs are a large part of the ongoing cost of operating the navigation system. In order to economically provide WCS navigation, it is important to minimize the amount of data transmitted while still meeting customers' navigation needs.

SUMMARY OF THE INVENTION

This invention is directed to methods and apparatus for reducing data transmission in a wireless client-server navigation system. In the preferred method, a request for data representative of a map-related feature is received at a central server from a mobile unit. Data describing the feature is obtained in the form of line segments interconnecting points having coordinates such as a shapefile or other format. An operation is performed on the data describing the feature to generate data representative of the feature in a data-reduced format, and the data representative of the feature in the data-reduced format is forwarded to the mobile unit issuing the request.

The map-related feature may include a route; a road; a lake, stream, river, ocean or other body of water; other geographic feature; or text. The operation may be performed when the request is received from the mobile unit, or the operation may be performed in advance of the request from the mobile unit, such that the data representative of the feature in the data-reduced format is stored in a memory for later retrieval.

According to one embodiment, the operation responsible for producing the data-reduced format includes the steps of: receiving data describing a map; partitioning the map into a plurality of tiles; designating a reference point within each tile; representing the feature in the form of offsets from the reference points; and wherein the data-reduced format is based upon the reference points and offsets. The tiles may or may not be substantially equal in size, and the offsets may be represented with Cartesian, polar, or any other appropriate coordinates.

Alternatively, the operation may include the steps of approximating the feature with a curve, whereby the data-reduced format includes a description of the curve. The description of the curve may include the coordinates of points along the curve, or a mathematical function, including a Bezier or other spline, a polynomial or fractal curve. In this and in other embodiments a standard may be provided regarding the extent to which the operation will affect the approximation of the feature, such that the operation will only be applied if the standard is met. The standard may be based upon map scale, a user preference, or other factors.

In a further alternative embodiment, the operation includes the steps of removing one or more of the points having the coordinates, leaving a plurality of remaining points describing the feature, such that the reduced-data format is represented with line segments interconnecting the remaining points. In all embodiments, the operation may include, alone or in combination with other embodiments, the step of applying a data-compression algorithm to the data representative of the feature in the data-reduced format prior to forwarding the data to the mobile unit issuing the request. The data-compression algorithm includes the Lempel-Ziv algorithm or a variant or extension thereof, fractal compression or other methodologies.

Data transmission can be further reduced by pre-generating turn information at the server and sending the information to the client along with a route. In many cases, simple map data is insufficient for the generation of turn instructions; as a result, in a wireless client server navigation system, additional information must be sent describing the intersections along the route. Data transmission can be reduced by prefiguring turn instructions at the server and sending the data in a reduced format. This method has two further advantages in a wireless client-server navigation system. First, figuring turn instructions at the server reduces tile required capability of the client, allowing it to be manufactured with less powerful, less expensive hardware. Second, the described methods of prefiguring turn instructions provide time saving over methods which figure turn instructions after a route is generated, reducing the amount of time required for each route generation and hence reducing the number of servers required to serve a given number of clients.

Although ideally suited to "turns," this embodiment is also applicable to any other type of traffic maneuvers including forks in the road; traffic circles, roundabouts or "rotaries"; and so forth. In essence, maneuver instructions are generated for every way of going through every intersection prior to the generation of a route. The maneuver instructions are then retrieved by referencing the in and out paths of the intersection or the following and previous points along a route. This is in contrast to standard methods where after a route is generated a decision tree is used at each maneuver along the route with if-then algorithms like "If the turn is approximately 90 deg to the right then the instruction is Turn Right"

A wireless client-server navigation system according to the invention includes a mobile unit and a central server. The mobile unit includes a wireless transmitter for transmitting a request for data representative of a map-related feature, a receiver for receiving the data representative of the map-related feature, and a display for displaying the feature on a map. The central server includes an input for receiving data describing map-related features in the form of line segments interconnecting points having coordinates, a receiver for receiving the request from the mobile unit, a processor for performing an operation on the data describing the map-related feature associated with the request by the mobile to generate data representative of the feature in a data-reduced format; and a transmitter for transmitting the data representative of the feature in the data-reduced format to the mobile unit. Other system-level aspects are disclosed and described in detail.

BRIEF DESCRIPTION OF THE DRAWINGS

FIG. 4 shows a fitted curve embodiment as a true geographic feature;

FIG. 5 shows a fitted curve as a line approximation to the geographic feature;

FIG. 6 shows a curve constructed to approximate a route;

FIG. 7A is a chart that shows data to be transmitted for the line approximation of FIG. 6.

FIG. 7B is a chart that shows data to be transmitted for the curve approximation of FIG. 6;

DETAILED DESCRIPTION OF THE INVENTION

The various embodiments described herein are intended to be used with a wireless client-server (WCS) navigation system. Such a system provides guidance in the form of maps, routes, and/or instructions, and
1) which has mobile clients used for requesting and receiving guidance,
2) which has a central server that houses databases of geographical information, and which generates guidance, and
3) wherein data is transmitted between the mobile clients and central server.

Tiling Embodiment

Figure 1:
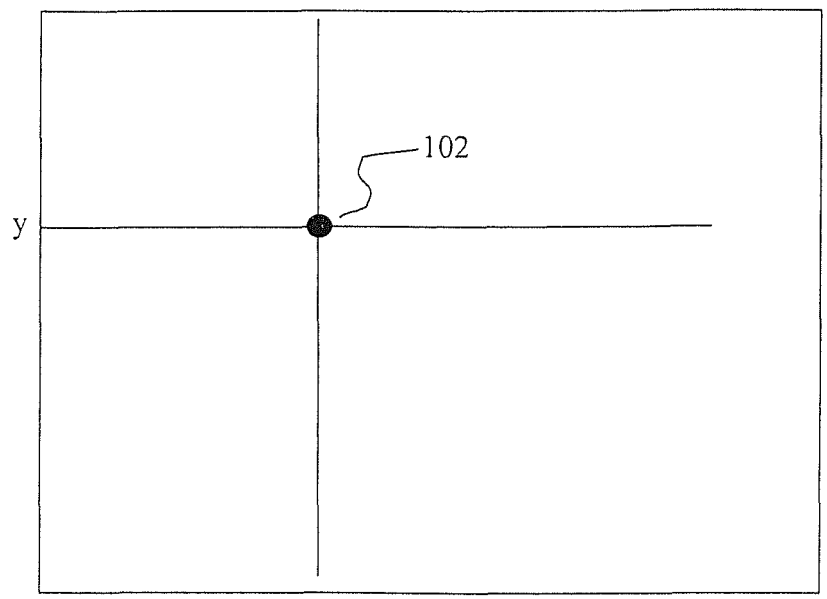
FIG. 1 shows a tile method according to the present invention.

In existing navigation systems, geographic data is often generated and stored using highly accurate but data-intensive means. For example, in the commonly used shapefile format depicted in FIG. 1, each point 102 is stored as an (x,y) coordinate using the double float data format, requiring a total of 16 bytes.

Figure 2:
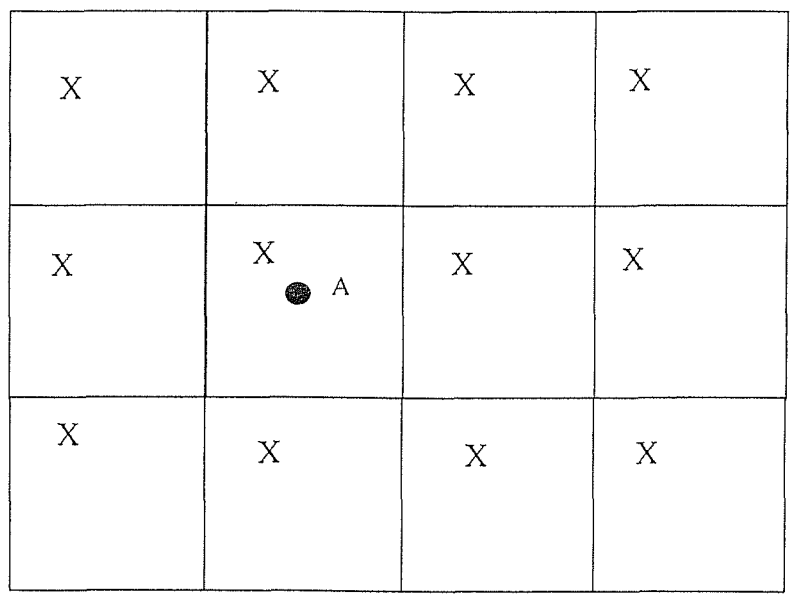
FIG. 2 shows a tile method with a map divided into tiles with reference points.
Figure 3:
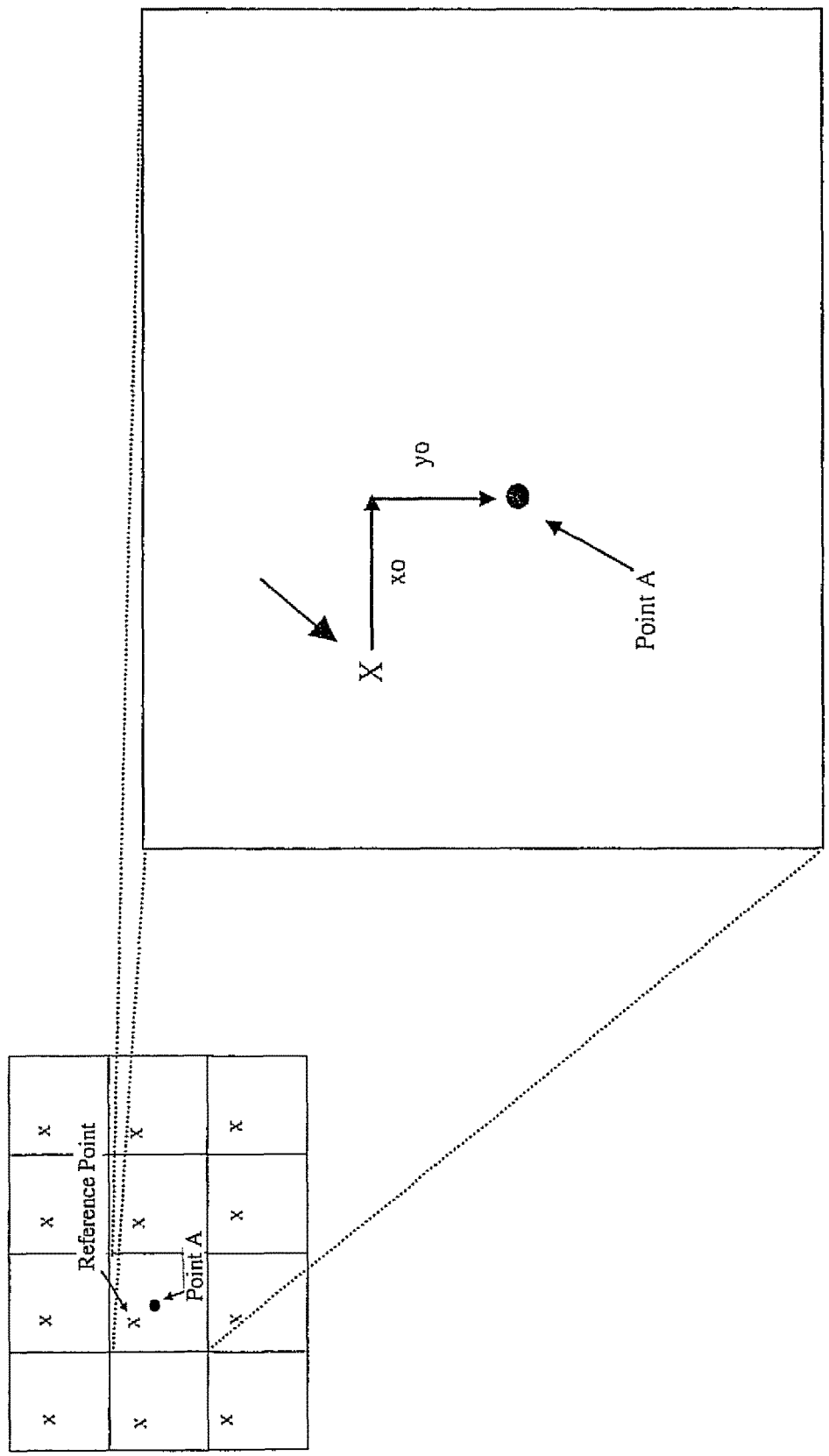
FIG. 3 shows a tile method with Point A being represented as an offset from a reference point.

The tile method according to this invention uses a less data intensive method to preserve required accuracy while minimizing the amount of data transmitted. In the tile method, depicted in FIG. 2, a map is divided into a set of tiles. The tiles are generally of equal size, although this is not necessary. Each tile is assigned a reference point X, and the coordinates of each point A within each tile are then represented as a offset (xo, yo in FIG. 3) from the reference point.

The tile method may be applied when a request for a map is received, or a tiled map may be generated then used for future map requests.

As an example of how this could provide benefits in data transmission, suppose points in a map are stored in shapefile format, requiring 16 bytes to represent each point. The map is divided up into tiles measuring one mile east-west by one mile north-south. Further suppose that it has been determined that users of the navigator require no greater resolution than 25 feet; meaning that if a feature is within 25 feet of where their navigator says, this is sufficient. A reference point is selected within the tile, and all points within the tile are represented as an offset from the reference location. In a one square mile tile, all locations can be measured as an offset from a reference point to within 25 feet by a set of data including x and y coordinates in 8 bit integer format, requiring 2 bytes total for each point, since 5280 feet/mile divided by $2^8$ is 20.625 feet.

In this example, 16 additional bytes of data are required to represent the reference point of each tile, but for each point within the tile, 14 bytes are saved. Thus if there is on average more than one point per tile, an overall reduction in data transmission can be achieved with the specific approach of this example.

The tile method also has the advantage of dividing data to be transmitted into discrete, easily manipulated units of data.

Fitted Curve Embodiment

Many standard representations of geographical information are limited to the use of straight lines. When a curve such as that shown in FIG. 4 must be approximated, a large number of straight lines are used instead, as shown in FIG. 5. While this improves the accuracy of the map, in WCS navigators it also greatly increases the amount of map data that must be transmitted.

According to this invention, instead of transmitting all of the points of straight lines representing a curve, the navigation system transmits information from which a curve can be constructed that approximates the lines provided in the geographical information.

In the first step of this method, a curve such as 602 shown in FIG. 6 is generated that approximates lines provided in geographical information. A large number of curve construction methods are possible, including Bezier curves, other splines, polynomial curves, and fractals. This method is not intended to be limited to any particular method of generating curves. A measure of accuracy of the generated curve is defined and used to judge the suitability of the curve.

Figure 8:
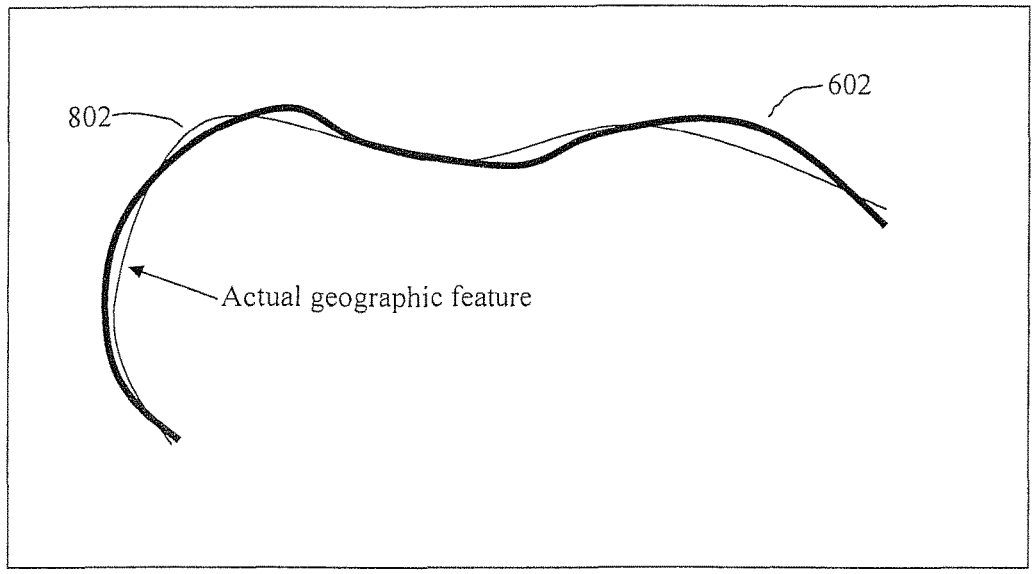
FIG. 8 shows a fitted curve as a geographic feature shown to a user.

The information representing the curve is then transmitted from the server to the client. The information may be a set of points along the curve, or it may be another arbitrary representation. The type of curve and information about how it is to be reconstructed may also be transmitted, or it may have been previously provided to the client. The client receives the information and from it constructs a graphical representation of the curve for use of the customer. FIG. 7A is a chart that shows data to be transmitted for line approximation, versus the curve approximation in FIG. 7B. FIG. 8 shows the approximation 602 versus the actual geographic feature 802. Again, information representing the curve may be generated at the time a user requests map information or it may be generated at an earlier time and stored for future use.

Point Removal Embodiment

Figure 9:
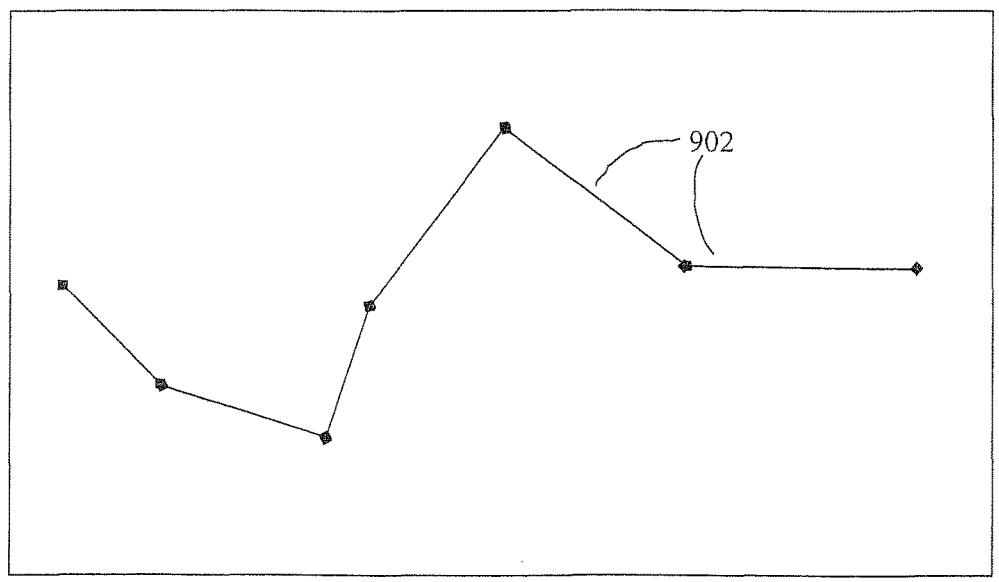
FIG. 9 shows a point removal embodiment according to the invention.

Many standard representations of geographical information are limited to the use of straight lines. When a curve must be approximated, a large number of straight lines 902 are used instead, as shown in FIG. 9. While this improves the accuracy of the map, in WCS navigators it also greatly increases the amount of map data that must be transmitted.

Figure 10:
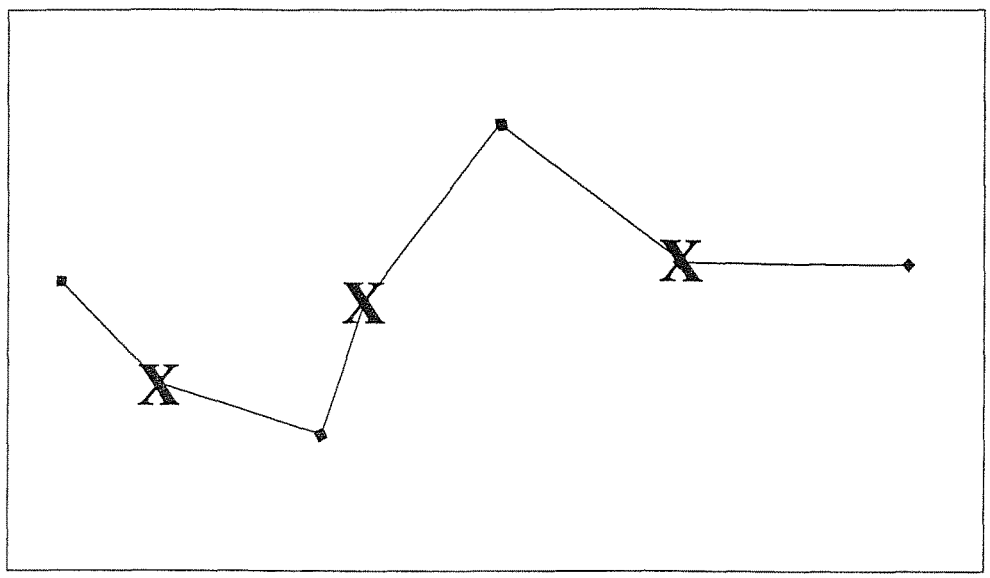
FIG. 10 shows points selected for removal.
Figure 11:
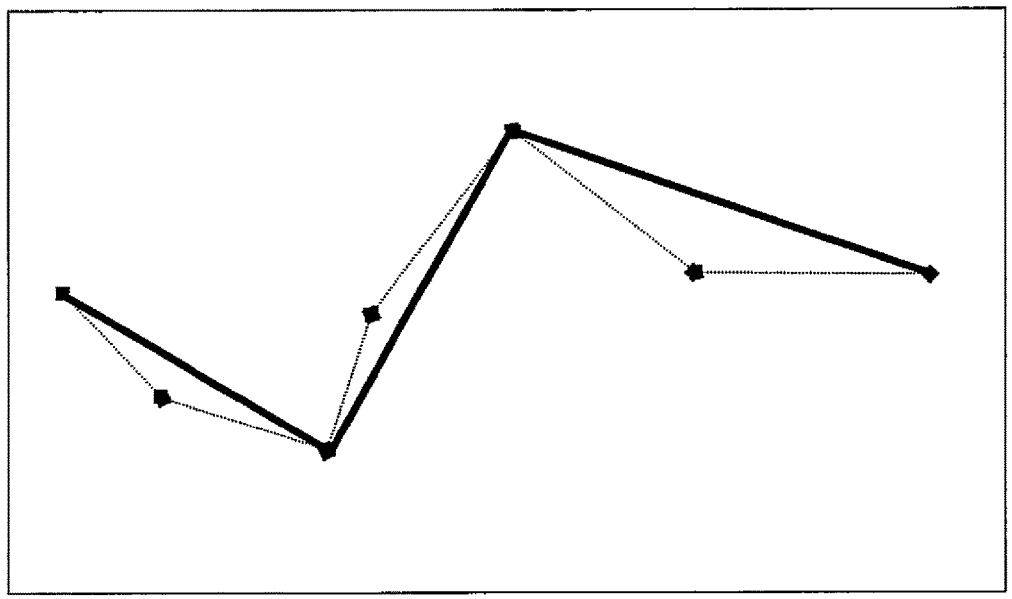
FIG. 11 shows a point removal example as an approximation of a geographic feature.
Figure 12:
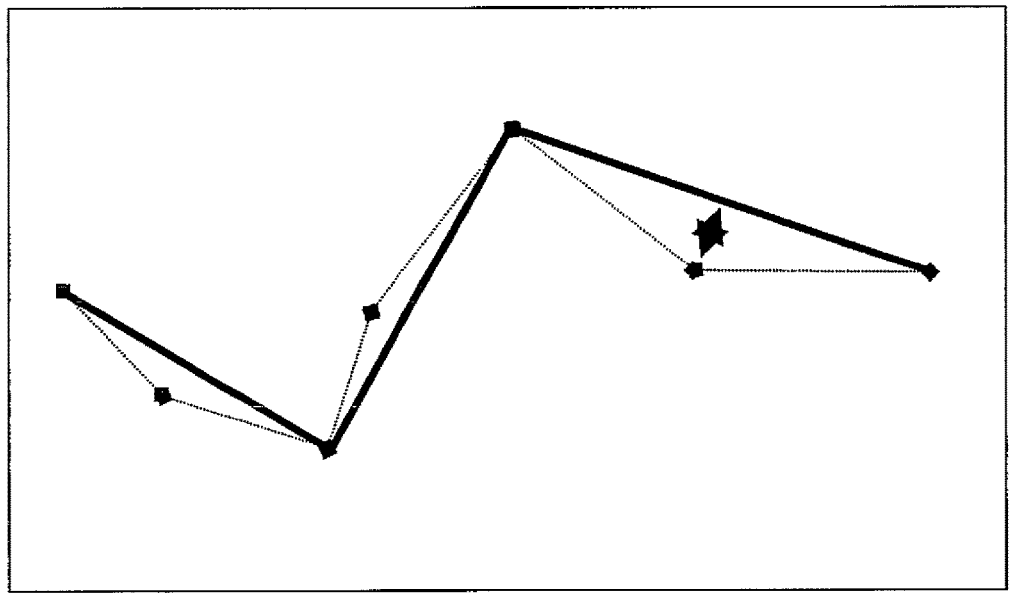
FIG. 12 shows a point removal example generating a measure of the accuracy of the approximation.

Many customers do not require the full accuracy provided by straight line approximations, particularly when maps are displayed that show large areas. For this reason it is useful to remove points of the representation if geographical data. In this method:

1) A set of line segments representing a geographical feature is considered.
2) One or more points defining the line segments are identified for removal (the Xs in FIG. 10).
3) A new set of line segments is constructed using the remaining points, which approximates the original set of line segments (FIG. 11).
4) A measure is generated of the nearness of the new set of line segments to the old set of line segments.
5) The measure is compared to a standard, and if the standard is met or exceeded, then the new set of line segments is used rather than the old set. Note that the standard may vary depending on map scale, user preferences, or other criteria. In FIG. 12, for example, the star-shaped symbol is used to show a relatively large deviation from actual which may not conform to a given standard.
6) The points of the new line segments are sent from the server to the client
7) A graphical representation of the new line segments are constructed by the client.

This method may be applied when a user requests a map, or various approximate maps may be generated and later used upon user request.

Data Compression Embodiment

In order to reduce the amount of data sent with a WCS navigator, a variety of data compression algorithms may be used. Common examples of such algorithms include the Lempel-Ziv algorithm, the DEFLATE algorithm, the Lempel-Ziv-Welch algorithm, and LZ-Renau algorithm, although this method is not intended to be limited to these particular algorithms. The data compression method is to use a data compression algorithm to reduce the amount of data transmitted in a WCS navigator.

Pregeneration of Turn Instruction Embodiment

Figure 13:
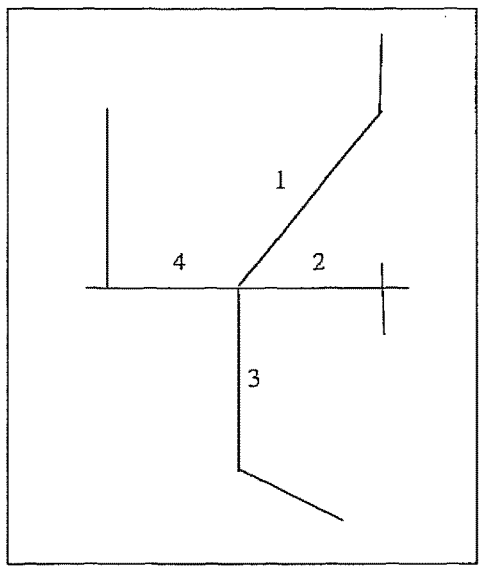
FIG. 13 shows an intersection and a list of turn instruction associated with the intersection.

In a database containing information about a network of roads, data describing intersections between roads is associated with information describing travel through the intersections given a previous and following intersection traversed. For example, in a four-way intersection aligned along the cardinal points of the compass, data describing travel through the intersection when the road from the previous intersection enters the intersection from the north and the road to the next intersection enters the intersection from the east would be "Turn left." FIG. 13 shows an example of turn instruction data associated with an intersection in map data.

Figure 14:
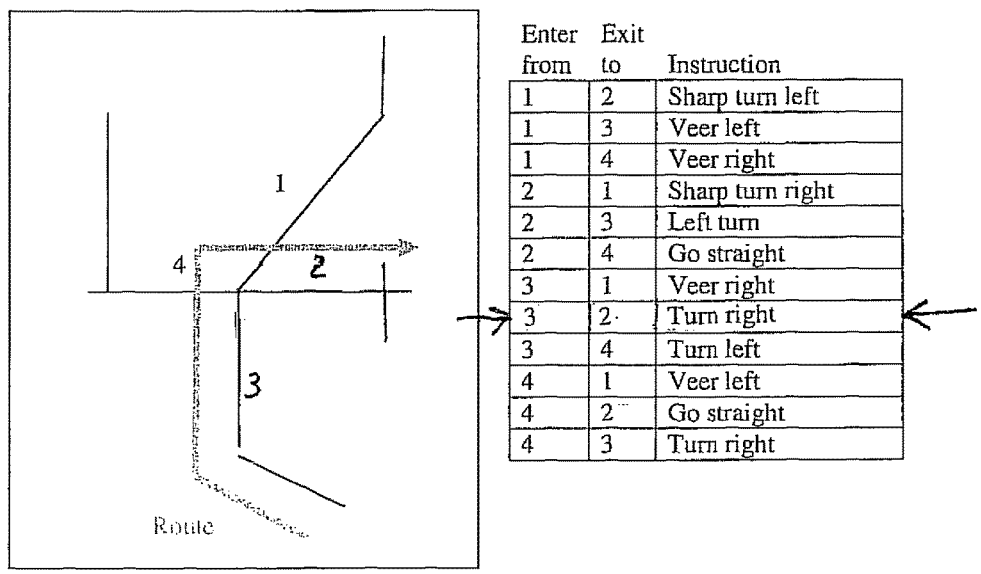
FIG. 14 illustrates that after a route is generated, the turn instructions are looked up from the table.

As shown in FIG. 14, when a navigator generates a route and instructions for traversing it, the instructions are generated by, for each intersection on the route, retrieving the information describing traversing the intersection given the preceding intersection on the route and the following intersection on the route.

In this method turn instruction are generated before a route is generated, stored for future use, and looked up after a route is generated. This method is in contrast to the commonly used method in which turn instructions are generated from a route after the route has been generated. The turn instruction may be stored or transmitted in text, graphic, audio, or tokenized form. Moreover, this aspect of the invention is not limited to turns, but is also applicable to any other type of traffic maneuvers including forks in the road; traffic circles, roundabouts or "rotaries"; and so forth.

I claim:

1. A method of reducing data transmission in a wireless client-server navigation system, comprising the steps of:
providing, at a server, a map with one or more intersections, each intersection being represented as a plurality of converging paths;
generating and storing intersection guidance instructions at the server in advance of a route request by a mobile client;
wherein the intersection guidance instructions are associated with every intersection within the map data, and wherein the instructions include a predetermined and prerecorded text message describing the action that should be taken by a driver when proceeding through each intersection for every possible combination of paths used to enter the intersection and paths used to leave the intersection;
wherein the intersection guidance instructions, including the predetermined and prerecorded text messages, are stored in a data structure with each instruction being referenced by the intersection, entry path, and exit path to which it applies;
generating a route in response to the request at the central server in the form of line segments interconnecting points having coordinates;
retrieving the intersection guidance instructions by referencing the paths of the intersection or previous and following points along the requested route; and
forwarding the intersection guidance instructions, including the predetermined and prerecorded text messages, to the mobile client issuing the route request.

2. The method of claim 1, wherein the coordinates are provided in a shapefile format.

3. The method of claim 1, including the step of applying a data-compression operation to the route or intersection guidance instructions prior to forwarding to the mobile unit issuing the request.

4. The method of claim 3, wherein the operation includes the Lempel-Ziv algorithm or a variant or extension thereof.

5. The method claim 1, wherein the paths are referenced with numbers or letters.

6. The method claim 1, wherein the intersection guidance is also presented using graphics, audio, video, or tokens.

7. The method of claim 1, wherein the intersection guidance includes a turn, fork in the road, traffic circle, roundabout, or rotary.

8. A method of reducing data transmission in a wireless vehicle navigation system wherein a central server having a database of geographical information transmits guidance to one or more mobile clients, the method comprising the steps of:
providing a map with one or more intersections, each intersection being represented as a plurality of converging paths;
generating maneuver instructions for every intersection in the map prior to receiving a route request from a mobile client, each maneuver instruction including a predetermined and prerecorded message communicating to the mobile client the action that should be taken by a driver with respect to all possible combinations of paths used to enter the intersection and paths used to leave the intersection;

receiving a request from the mobile client for a route through one or more of the intersections;

retrieving the maneuver instructions, including the predetermined and prerecorded messages for the one or more intersections associated with the requested route, by referencing the paths of the intersection or previous and following points along the route; and providing guidance from the central server to the user including the maneuver instructions and the predetermined and prerecorded messages.

9. The method claim 8, wherein the paths are referenced with numbers or letters.

10. The method claim 8, wherein the predetermined and prerecorded messages are presented using text, graphics, audio, video, or tokens.

11. The method of claim 8, wherein the maneuver is a turn, fork in the road, traffic circle, roundabout, or rotary.

* * * * *